United States Patent
Oota et al.

(10) Patent No.: US 11,104,793 B2
(45) Date of Patent: Aug. 31, 2021

(54) MOLDING MATERIAL AND FIBER-REINFORCED COMPOSITE MATERIAL

(71) Applicant: Mitsubishi Chemical Corporation, Chiyoda-ku (JP)

(72) Inventors: Akira Oota, Tokyo (JP); Masahiro Ichino, Tokyo (JP); Takuya Teranishi, Tokyo (JP); Yusuke Watanabe, Tokyo (JP); Natsumi Mukouzaka, Tokyo (JP)

(73) Assignee: Mitsubishi Chemical Corporation, Chiyoda-ku (JP)

( * ) Notice: Subject to any disclaimer, the term of this patent is extended or adjusted under 35 U.S.C. 154(b) by 0 days.

(21) Appl. No.: 16/688,716

(22) Filed: Nov. 19, 2019

(65) Prior Publication Data

US 2020/0087506 A1 Mar. 19, 2020

Related U.S. Application Data

(63) Continuation of application No. PCT/JP2018/018491, filed on May 14, 2018.

(30) Foreign Application Priority Data

May 24, 2017 (JP) .............................. JP2017-103062
Jul. 27, 2017 (JP) .............................. JP2017-145253

(51) Int. Cl.
| | |
|---|---|
| *C08G 59/50* | (2006.01) |
| *C08G 59/42* | (2006.01) |
| *C08L 63/00* | (2006.01) |
| *C08J 5/10* | (2006.01) |
| *C08J 5/24* | (2006.01) |
| *B29C 43/00* | (2006.01) |
| *C08G 59/24* | (2006.01) |
| *C08G 59/40* | (2006.01) |
| *C08J 5/04* | (2006.01) |
| *C08K 3/04* | (2006.01) |
| *C08K 5/09* | (2006.01) |
| *C08K 5/103* | (2006.01) |
| *C08K 7/06* | (2006.01) |

(52) U.S. Cl.
CPC ............ *C08L 63/00* (2013.01); *B29C 43/003* (2013.01); *C08G 59/245* (2013.01); *C08G 59/4021* (2013.01); *C08G 59/5006* (2013.01); *C08J 5/042* (2013.01); *C08K 3/04* (2013.01); *C08K 5/09* (2013.01); *C08K 5/103* (2013.01); *C08K 7/06* (2013.01); *C08L 2201/08* (2013.01)

(58) Field of Classification Search
None
See application file for complete search history.

(56) References Cited

U.S. PATENT DOCUMENTS

| | | | |
|---|---|---|---|
| 7,169,462 B1 | 1/2007 | Rooshenas | |
| 10,494,475 B2 * | 12/2019 | Oota | ........................ C08J 5/042 |
| 2002/0061941 A1 * | 5/2002 | Masamune | ................ C08J 3/03 |
| | | | 523/404 |
| 2003/0135011 A1 * | 7/2003 | Goto | ...................... C08G 59/18 |
| | | | 528/93 |
| 2008/0255283 A1 | 10/2008 | Aoki et al. | |
| 2016/0083544 A1 | 3/2016 | Osaka et al. | |
| 2018/0142057 A1 | 5/2018 | Oota et al. | |

FOREIGN PATENT DOCUMENTS

| | | |
|---|---|---|
| CN | 106398119 A | 2/2017 |
| EP | 0 173 137 A2 | 3/1986 |
| EP | 3 296 359 A1 | 3/2018 |
| JP | 59-149923 A | 8/1984 |
| JP | 61-43619 A | 3/1986 |
| JP | 2-133947 A | 5/1990 |
| JP | 3-38330 A | 2/1991 |
| JP | 3-157449 A | 7/1991 |
| JP | 5-329976 A | 12/1993 |
| JP | 6-166742 A | 6/1994 |
| JP | 8-157695 A | 6/1996 |
| JP | 2001-72783 A | 3/2001 |
| JP | 2003-26904 A | 1/2003 |
| JP | 2003-73528 A | 3/2003 |
| JP | 2003-192747 A | 7/2003 |
| JP | 2005-15693 A | 1/2005 |

(Continued)

OTHER PUBLICATIONS

International Search Report dated Jul. 17, 2018 in PCT/JP2018/018491 filed May 14, 2018 (with English Translation).

(Continued)

*Primary Examiner* — Michael J Feely

(74) *Attorney, Agent, or Firm* — Oblon, McClelland, Maier & Neustadt, L.L.P.

(57) ABSTRACT

A molding material that enables acquirement of a fiber-reinforced composite material which has excellent demoldability from a mold and excellent surface appearance, which contaminates a mold surface after molding less, and which has excellent mechanical properties and heat resistance; and a fiber-reinforced composite material which has excellent demoldability from a mold and surface appearance, which contaminates a mold surface after molding less, and which has excellent mechanical properties and heat resistance, are provided. A molding material of the present invention includes a component (A): an epoxy resin; a component (B): an epoxy resin curing agent; a component (C): a compound that has a solubility parameter of 11.2 or less and a melting point of 115° C. or lower; and a reinforcement fiber.

19 Claims, No Drawings

(56) References Cited

FOREIGN PATENT DOCUMENTS

| | | | |
|---|---|---|---|
| JP | 2006-16446 | A | 1/2006 |
| JP | 2008-189833 | A | 8/2008 |
| JP | 2009-19099 | A | 1/2009 |
| JP | 2011-6508 | A | 1/2011 |
| JP | 2012-92168 | A | 5/2012 |
| JP | 2012-167225 | A | 9/2012 |
| JP | 2013-127132 | A | 6/2013 |
| JP | 2015-151457 | A | 8/2015 |
| JP | 2015-166457 | A | 9/2015 |
| JP | 2016-180071 | A | 10/2016 |
| JP | 2017-71708 | A | 4/2017 |
| JP | 2017-203107 | A | 11/2017 |
| WO | WO2014/189101 | A1 | 11/2014 |
| WO | WO2016/182077 | A1 | 11/2016 |

OTHER PUBLICATIONS

Japanese Office Action dated Jun. 11, 2019 for corresponding Japanese Application No. 2018-528074 (with English Translation), 17 pages.

Notification (Information Statement) mailed on Sep. 10, 2019 for corresponding Japanese Application No. 2018-528074 (with English Translation), 12 pages.

Third Party Observation mailed on Sep. 12, 2019 for corresponding PCT/JP2018/018491.

Mold Wiz INT-1882, technical data, May 8, 2012, https://axelplastics.com/wp-content/uploads/2017/10/TD-INT-1882.pdf, 1 page.

Information offer form issued Feb. 20, 2020 in corresponding Japanese Patent Application No. 2018-528074 (with English Translation), 3 pages.

Mitsubishi Chemical Corporation, "Fatty Acid Amide", (with English Translation), 7 pages SLIPAKS O <https://www.m-chemical.co.jp/products/departments/mcc/metablen/product/1203775_7202.html>, Apr. 9, 2020.

European Office Action dated Jan. 23, 2020 in Patent Application No. 18806851.4, 4 pages.

Extended European Search Report dated Feb. 14, 2020 in Patent Application No. 18806851.4, 7 pages.

Ha. Q. Pham, et al., "Epoxy Resins" Encyclopedia of Polymer Science and Technology, vol. 9, XP007920796, Jan. 1, 2004, pp. 1-127.

Office Action dated Dec. 24, 2019 in Japanese Patent Application No. 2018-528074 (with unedited computer generated English translation obtained by Global Dossier on Jan. 29, 2020), 6 pages.

\* cited by examiner

MOLDING MATERIAL AND FIBER-REINFORCED COMPOSITE MATERIAL

This application is a continuation application of International Application No. PCT/JP2018/018491, filed on May 14, 2018, which claims the benefit of priority of the prior Japanese Patent Application No. 2017-103062, filed May 24, 2017 and Japanese Patent Application No. 2017-145253, filed Jul. 27, 2017, the contents of which are incorporated herein by reference.

TECHNICAL FIELD

The present invention relates to a molding material and a fiber-reinforced composite material.

BACKGROUND ART

Intermediate materials used for manufacture of fiber-reinforced composite materials (FRPs) (hereinafter also referred to as "molding materials"), in particular, sheet molding compounds (hereinafter also referred to as "SMCs"), were put to practical use in the early 1970s. In recent years, demand therefor in manufacturing industrial parts, automotive parts, bathtubs, and the like has increased. An SMC is composed of reinforcement short fibers and a matrix resin. An SMC is manufactured by impregnating the reinforcement short fibers with a thermosetting resin composition and molding into a sheet shape. In addition, a fiber-reinforced composite material is manufactured by heat-compressing the SMC in a mold, and curing the thermosetting resin composition. Examples of thermosetting resins used for SMCs include unsaturated polyester resins, vinyl ester resins, epoxy resins, phenol resins, and the like.

By using an epoxy resin as a thermosetting resin used for the SMC, excellent mechanical properties (strength and modulus of elasticity) and heat properties (heat resistance) can be exhibited in the fiber-reinforced composite material. In addition, an epoxy resin has excellent adhesiveness to other materials. In particular, interface adhesion between prepregs in which the epoxy resin composition is used as a matrix resin is very firm. For this reason, in a case where the epoxy resin is used as the thermosetting resin, it is possible to obtain a fiber-reinforced composite material in which interface fracture, which is a problem of the related art, occurs less.

As an epoxy resin composition used for an SMC, the following is proposed.

An epoxy resin composition (1) which is composed of an aromatic epoxy resin, an amino compound represented by a specific formula, dicyandiamide, and an imidazole compound; and which is easy to be B-staged (Patent Literature 1).

As an epoxy resin composition used for a semiconductor encapsulation, the following is proposed.

An epoxy resin composition (2) which is obtained by blending a melt mixture of a compatibilizing agent such as a surfactant, and a mold release agent such as carnauba wax or stearic acid (hereinafter also referred to as an internal mold release agent) into an epoxy resin composition containing an epoxy resin, a curing agent, and an inorganic filling material; and which has excellent demoldability after continuous molding (Patent Literature 2).

CITATION LIST

Patent Literature

[Patent Literature 1]
 Japanese Patent Laid-Open No. Hei 06-166742
[Patent Literature 2]
 Japanese Patent Laid-Open No. Hei 08-157695

SUMMARY OF INVENTION

Technical Problem

With a fiber-reinforced composite material obtained by curing an SMC, the SMC is molded in molds having various shapes, and the fiber-reinforced composite material is continuously manufactured using the same mold. Accordingly, the fiber-reinforced composite material obtained by curing an SMC is required to have excellent demoldability from a mold.

However, the epoxy resin composition used for an SMC is highly adhesive and thus firmly adheres to a mold. For this reason, a fiber-reinforced composite material obtained by curing an SMC formed of an epoxy resin composition has poor demoldability from a mold. A fiber-reinforced composite material having poor demoldability has a long mold occupancy time, and therefore productivity deteriorates. In addition, when attempting to demold a fiber-reinforced composite material firmly adhered to a mold, a load is applied to the fiber-reinforced composite material.

Although an external mold release agent can be used to improve demoldability of a fiber-reinforced composite material from a mold, subsequent processes such as application may then be adversely affected if the mold release agent is transferred to the surface of the fiber-reinforced composite material after demolding, or molding of molded products of other materials may be adversely affected in many cases because the mold release agent remains on a mold surface. Furthermore, in a case of a mold having a complicated shape, locations at which application of the external mold release agent is difficult, or unevenness in application may partially occur.

Furthermore, although an internal mold release agent can be used to improve demoldability, internal mold release agents of the related art have problems of transfer of an eluted internal mold release agent to a mold and adversely affecting subsequent processes, or agglomeration of an eluted internal mold release agent on an exterior of a fiber-reinforced composite material and affecting the exterior.

The epoxy resin composition (1) is easily B-staged and thus is considered to be suitable for an SMC. However, demoldability of a fiber-reinforced composite material from a mold is not taken into consideration in the epoxy resin composition (1).

The epoxy resin composition (2) is considered to have excellent demoldability after continuous molding in semiconductor encapsulation. The epoxy resin composition (2) uses a carnauba wax, a metal soap, and the like, which have been used in the related art, as a mold release agent. However, in a case of using the epoxy resin composition (2) for an SMC, when the mold release agent of the related art is used, an effect as an internal mold release agent is not obtained, and demoldability of a fiber-reinforced composite material from a mold is insufficient.

The present invention provides a molding material that enables acquirement of a fiber-reinforced composite material which has excellent demoldability from a mold and excellent surface appearance, which contaminates a mold surface after molding less, and which has excellent mechanical properties and heat resistance; and a fiber-reinforced composite material which has excellent demoldability from a mold and surface appearance, which contaminates a mold surface after molding less, and which has excellent mechanical properties and heat resistance.

Solution to Problem

As a result of intensive studies, the present inventors have found that the above-mentioned problems can be solved by blending a specific compound into a molding material, and the present invention has been achieved.

The present invention includes the following aspects.

[1]
A molding material including:
a component (A): an epoxy resin;
a component (B): an epoxy resin curing agent;
a component (C): a compound that has a solubility parameter of 11.2 or less and a melting point of 115° C. or lower; and
a reinforcement fiber.

[2]
The molding material according to [1], in which at least one kind of compounds contained for the component (C) is a compound selected from ester compounds of a fatty acid and a fatty alcohol, ester compounds of a polyvalent carboxylic acid and a fatty alcohol, ester compounds of a polyhydric alcohol and a fatty acid, fatty alcohols, fatty acid amides, and metal salts of fatty acids.

[3]
The molding material according to [1] or [2], in which at least one kind of compounds contained for the component (C) is a compound having a solubility parameter of 8.0 to 9.6, or 10.3 to 10.9.

[4]
The molding material according to any one of [1] to [3], in which at least one kind of compounds contained for the component (C) is a compound having a melting point of −30° C. or higher.

[5]
A molding material including:
a component (A): an epoxy resin;
a component (B): an epoxy resin curing agent;
a component (C): a compound which is at least one of an ester compound having an alkyl group having 5 to 40 carbon atoms or a fatty alcohol having an alkyl group having 5 to 40 carbon atoms; and
a reinforcement fiber.

[6]
The molding material according to [5], in which at least one kind of the compounds contained for the component (C) is an aliphatic compound having a hydroxyl group.

[7]
The molding material according to [6], in which at least one kind of the compounds contained for the component (C) is a sorbitan fatty acid ester.

[8]
The molding material according to [7], in which at least one kind of the compounds contained for the component (C) is sorbitan monostearate.

[9]
The molding material according to any one of [1] to [8], in which at least one kind of epoxy resin curing agents contained for the component (B) is at least one of a polyamine-based compound and an acid anhydride-based compound.

[10]
The molding material according to any one of [1] to [9], in which at least one kind of epoxy resin curing agents contained for the component (B) is an alicyclic diamine.

[11]
The molding material according to any one of [1] to [10], in which at least one kind of epoxy resin curing agents contained for the component (B) is dicyandiamide.

[12]
The molding material according to any one of [1] to [11], in which the reinforcement fiber is a carbon fiber.

[13]
The molding material according to any one of [1] to [12], which is a sheet molding compound.

[14]
A fiber-reinforced composite material which is a cured product of the molding material according to any one of [1] to [13].

Advantageous Effects of Invention

By using the molding material of the present invention, it is possible to obtain a fiber-reinforced composite material which has excellent demoldability from a mold and excellent surface appearance, which contaminates a mold surface after molding less, and which has excellent mechanical properties and heat resistance.

The fiber-reinforced composite material of the present invention has excellent demoldability from a mold and excellent surface appearance, contaminates a mold surface after molding less, and has excellent mechanical properties and heat resistance.

DESCRIPTION OF EMBODIMENTS

The following definitions of terms apply throughout the present specification and claims.

An "epoxy resin" is a compound having one or more epoxy groups in a molecule. A mono functional epoxy resin is a compound having one epoxy group, a bifunctional epoxy resin is a compound having two epoxy groups, a trifunctional epoxy resin is a compound having three epoxy groups, and a tetrafunctional epoxy resin is a compound having four epoxy groups.

A "solubility parameter" is obtained by the Fedors' method, which is one method of obtaining a solubility parameter from a molecular structure. Specifically, in consideration of the fact that both a cohesive energy density and molar molecular volume depend on the type and number of substituents, a solubility parameter is obtained using constants shown in Equation (2) and R. F. Fedors, Polym. Eng. Sci., 14 [2], 147-154 (1974).

$$\delta = [\Sigma Ecoh / \Sigma V]^{1/2} \qquad (2)$$

δ is a solubility parameter, ΣEcoh is a cohesive energy, and ΣV is a molar molecular volume.

A "melting point" is a temperature corresponding to an intersection of a baseline at an endothermic start side, and a tangent line of an inflection point at the lowest temperature peak occurring due to a melting point, on a DSC heating curve from differential scanning calorimetry (DSC).

A "β-carbon of an amino group" is a carbon atom adjacent to a carbon atom (α-carbon) to which an amino group is bonded.

A "curing agent" in components (B) is an additive that can be cured in 2 minutes to 300 minutes at an atmospheric temperature of 100 to 200° C. for example. In addition, among the components (B), some substances can act as a "viscosity improver." The viscosity improver is an additive that can increase a viscosity to a desired viscosity value in 1 hour to 200 hours at an atmospheric temperature of 20 to 80° C. and then can stabilize the viscosity value.

A "polyamine compound" is a compound having two or more amino groups in a molecule.

A "reinforcement fiber substrate" is a collection of reinforcement fibers. Specific examples of reinforcement fiber substrates include a reinforcement fiber bundle, a sheet-like material in which chopped reinforcement fiber bundles are two-dimensionally randomly stacked, and the like.

The term "to" indicating a numerical value range has a meaning including numerical values denoted before and afterward as a lower limit value and an upper limit value.

<Molding Material>

A molding material of one aspect of the present invention includes
an epoxy resin composition containing
a component (A): an epoxy resin,
a component (B): an epoxy resin curing agent, and
a component (C): a compound that has a solubility parameter of 11.2 or less and a melting point of 115° C. or lower; and
a reinforcement fiber.

In addition, a molding material of another aspect of the present invention includes
an epoxy resin composition containing
a component (A): an epoxy resin,
a component (B): an epoxy resin curing agent, and
a component (C): a compound which is at least one of an ester compound having an alkyl group having 5 to 40 carbon atoms or a fatty alcohol having an alkyl group having 5 to 40 carbon atoms; and
a reinforcement fiber.

In the present invention, the epoxy resin composition contained in the molding material of the present invention refers to components other than the reinforcement fiber which is contained in the molding material of the present invention.

Examples of molding materials include a prepreg, a tow prepreg, an SMC, a BMC, and the like. Viscosity characteristics of the epoxy resin composition of the present invention and physical properties of a viscosity-improved product are suitable for an SMC or BMC. Therefore, as a molding material, an SMC or BMC is preferable, and an SMC is particularly preferable.

The above-described epoxy resin composition may further contain other components as needed, within a range not impairing the effects of the present invention.

A viscosity of the above-described epoxy resin composition at 25° C. is preferably 0.1 to 10 Pa·s, and is more preferably 0.5 to 5 Pa·s.

When the viscosity of the epoxy resin composition at 25° C. is 0.1 to 10 Pa·s, impregnation of the reinforcement fiber substrate therewith is favorable. When the viscosity of the epoxy resin composition at 25° C. is 0.5 to 5 Pa·s, in addition to the impregnating ability with respect to the reinforcement fiber substrate, accuracy of application on a carrier film is high in manufacture of an SMC and the like (low variation in fiber weight per unit).

The viscosity of the epoxy resin composition at 25° C. is measured using an E-type viscometer.

(Component (A))

The component (A) is an epoxy resin.

Examples of components (A) include glycidyl ethers of bisphenols (bisphenol A, bisphenol F, bisphenol AD, their halogen substitutes, and the like); glycidyl ethers of polyhydric phenols obtained by condensation reaction of phenols with aromatic carbonyl compounds; glycidyl ethers of polyhydric alcohols (polyoxyalkylene bisphenol A and the like); polyglycidyl compounds derived from aromatic amines; and the like.

As the component (A), a bisphenol-type epoxy resin which is liquid at 25° C. is preferable from the viewpoint that a viscosity of the epoxy resin composition is easily adjusted to a viscosity suitable for impregnation of a reinforcement fiber substrate therewith, and that mechanical properties of the fiber-reinforced composite material are easily adjusted to a desired range.

As bisphenol-type epoxy resins, a bisphenol A-type epoxy resin is more preferable from the viewpoint that a heat resistance and chemical resistance of the fiber-reinforced composite material then become favorable.

In addition, a bisphenol F-type epoxy resin is even more preferable from the viewpoint that a viscosity thereof is lower than that of the bisphenol A-type epoxy resin having the same molecular weight, and a modulus of elasticity of the fiber-reinforced composite material then becomes high.

As the component (A), a bifunctional epoxy resin is generally used.

As the component (A), a trifunctional epoxy resin or a tetrafunctional epoxy resin may be used. By blending in a trifunctional epoxy resin or a tetrafunctional epoxy resin, the heat resistance of the fiber-reinforced composite material can be further improved without impairing other physical properties.

Examples of commercial products of a bifunctional epoxy resin include the following:

jER (registered trademark) 825, 827, 828, 828EL, 828US, 828XA, 806, 806H, 807, 1750, and YL6810, which are manufactured by Mitsubishi Chemical Corporation;

EPICLON (registered trademark) 840, 840-S, 850, 850-S, EXA-850CRP, 850-LC, 830, 830-S, 835, EXA-830CRP, EXA-830LVP, and EXA-835LV, which are manufactured by DIC Corporation;

Epotohto (registered trademark) YD-127, YD-128, YD-128G, YD-128S, YD-128CA, and YDF-170, which are manufactured by Nippon Steel & Sumikin Chemical Co., Ltd.;

RE-303S-L, RE-310S, GAN, and GOT, which are manufactured by Nippon Kayaku Co., Ltd.; and the like Examples of commercial products of a tri- or higher functional epoxy resin include the following:

jER (registered trademark) 152, 604, 630, and 630LSD, which are manufactured by Mitsubishi Chemical Corporation;

YH-434 and YH434L which are manufactured by Nippon Steel & Sumikin Chemical Co., Ltd.;

SUMI-EPOXY (registered trademark) ELM434, ELM100, and ELM120, which are manufactured by SUMITOMO CHEMICAL COMPANY, LIMITED;

TETRAD-X manufactured by MITSUBISHI GAS CHEMICAL COMPANY, INC.; and the like

As the component (A), one kind may be used alone, or two or more kinds thereof may be used in combination.

A content of the component (A) in the epoxy resin composition of the present invention is preferably designed such that a viscosity of the epoxy resin composition at 25° C. becomes 0.1 to 10 Pa·s, and the content varies depending on the type of the component (A).

In a case where a tri- or higher functional epoxy resin is used in combination in the component (A), a content of the tri- or higher functional epoxy resin in 100 parts by mass of the component (A) is preferably 5 to 80 parts by mass.

When the content is designed within the above-mentioned range, it is possible to increase heat resistance while maintaining a viscosity at which impregnation of a reinforcement fiber with a resin composition is favorable.

(Component (B))

The component (B) is an epoxy resin curing agent.

As the component (B), one kind may be used alone, or two or more kinds thereof may be used in combination.

The component (B) affects mechanical properties and storage stability of a cured product of the molding material of the present invention containing the above-mentioned epoxy resin composition, and a temperature and time of curing. In addition, among components (B), some substances can act as a "viscosity improver."

The component (B) is not limited as long as it can cure an epoxy resin. Examples thereof include amine complexes such as amine compounds, acid anhydride compounds, phenols, mercaptans, and Lewis acids; boron chloride amine complexes; imidazole compounds; and the like. In addition, as a form thereof, it is possible to adopt various forms such as a microcapsule type and denatured type.

As the component (B), it is preferable to incorporate at least one of an amine compound, particularly a polyamine compound to be described later, or an acid anhydride compound.

Examples of amine compounds that can be used for the component (B) include polyamine compounds such as aliphatic amines, polyether amines, alicyclic amines, and aromatic amines; and monofunctional amines.

Examples of aliphatic amines include ethylenediamine, 1,3-diaminopropane, 1,4-diaminobutane, hexamethylenediamine, 2,5-dimethylhexamethylenediamine, trimethylhexamethylenedi amine, diethylenetriamine, iminobispropylamine, bis(hexamethylene)triamine, triethylenetetramine, tetraethylenepentamine, pentaethylenehexamine, N-hydroxyethylethylenediamine, tetra(hydroxyethyl)ethylenediamine, and the like.

Examples of polyether amines include triethylene glycol diamine, tetraethylene glycol diamine, diethylene glycol bis(propylamine), polyoxypropylene diamine, polyoxypropylene triamines, and the like.

Examples of alicyclic amines include isophorone diamine, methacenediamine, bis(4-amino-3-methyldicyclohexyl)methane, bis(aminomethyl)cyclohexane, 3,9-bis(3-aminopropyl)-2,4,8,10-tetraoxaspiro(5,5)undecane, norbornenediamine, and the like.

Examples of aromatic amines include tetrachloro-p-xylenediamine, m-xylenediamine, p-xylenediamine, m-phenylenediamine, o-phenylenediamine, p-phenylenediamine, 2,4-diaminoanisole, 2,4-toluenediamine, diethyltoluenediamine, 2,4-diaminodiphenylmethane, 4,4'-diaminodiphenylmethane, 4,4'-diamino-1,2-diphenylethane, 2,4-diaminodiphenylsulfone, 4,4'-diaminodiphenylsulfone, m-aminobenzylamine, α-(m-aminophenyl) ethylamine, α-(p-aminophenyl)ethylamine, diaminodiethyldimethyldiphenylmethane, α,α'-bis(4-aminophenyl)-p-diisopropylbenzene, and the like.

As the component (B), one kind may be used alone, or two or more kinds thereof may be used in combination at an arbitrary blending ratio.

As the component (B), alicyclic amines are preferable from the viewpoint of excellent effects as a viscosity improver being exhibited.

As the component (B), an alicyclic diamine is preferable from the viewpoint that a pot life of the molding material containing the above-mentioned epoxy resin composition can be extended, and storage stability at B-staging becomes favorable. Among them, an alicyclic diamine having one or two cyclohexane rings in a molecule is more preferable.

As the component (B), a compound having an alicyclic skeleton in a molecule and in which an amino group is directly bonded to the alicyclic skeleton is preferable from the viewpoint that a pot life of the molding material can be extended, and storage stability at B-staging becomes favorable.

As the component (B), a primary amine having two alicyclic skeletons in a molecule is preferable from the viewpoint that a pot life of the molding material can be extended, and storage stability at B-staging becomes favorable.

The component (B) is preferably an alicyclic diamine having a substituent other than an amino group at the β carbon of the amino group. In the case of an alicyclic diamine having a substituent other than an amino group at the β carbon of the amino group, a pot life of the epoxy resin composition can be extended further because a reaction of active hydrogen of the amino group tends to be inhibited.

As a substituent other than an amino group, from the viewpoint of extending a pot life of the epoxy resin composition, an alkyl group having 1 to 4 carbon atoms, a benzyl group, and a cyclohexyl group are preferable; an alkyl group having 1 to 4 carbon atoms is more preferable; and a methyl group, an ethyl group, and an isopropyl group are particularly preferable.

As the component (B), a compound represented by Formula (1) is preferable from the viewpoint of combining the characteristics described above.

[Chem. 1]

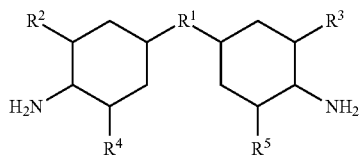

(1)

$R^1$ is a single bond, a methylene group, $-C(CH_3)_2-$, $-O-$, or $-SO_2-$; and $R^2$, $R^3$, $R^4$, and $R^5$ each independently represent a hydrogen atom or an alkyl group having 1 to 4 carbon atoms.

Specific examples of the compound represented by Formula (1) include
3,3'-dimethyl-4,4'-diaminodicyclohexylmethane,
3,3'-diethyl-4,4'-diaminodicyclohexylmethane,
bis(4-amino-3-methyl-5-ethylcyclohexyl)methane,
3,3',5,5'-tetramethyl-4,4'-diaminodicyclohexylmethane,
4,4'-diaminodicyclohexylmethane, and the like.

As the compound represented by Formula (1), one kind may be used alone, or two or more kinds thereof may be used in combination.

As the compound represented by Formula (1), 3,3'-dimethyl-4,4'-diaminodicyclohexylmethane is particularly preferable from the viewpoint of rapid curing of the epoxy resin composition after B-staging.

In addition, a monofunctional amine may be blended in for the component (B). For example, by using it in combination with an alicyclic diamine, it is possible to adjust a viscosity improving property of the molding material of the present invention. Examples of monofunctional amines include aniline, benzylamine, cyclohexylamine, and the like.

In a case where a monofunctional amine is used in combination for the component (B), a content of the monofunctional amine is preferably 0.01 to 5 parts by mass, and is more preferably 0.1 to 2 parts by mass with respect to 100 parts by mass of the component (A) from the viewpoint of avoiding a decrease in pot life of the molding material.

Examples of imidazole compounds include imidazole compounds in which the 5-position hydrogen of 1H-imidazole is substituted with a hydroxymethyl group and the 2-position hydrogen is substituted with a phenyl group or a toluyl group, such as
2,4-diamino-6-[2-(2-methyl-1-imidazolyl)]ethyl-s-triazine,
2,4-diamino-6-[2-(2'-methyl-1'-imidazolyl)]ethyl-s-triazine,
2-phenyl-4,5-bis(hydroxymethyl)imidazole,
2-phenyl-4-methyl-5-hydroxymethylimidazole,
2-phenyl-4-benzyl-5-hydroxymethylimidazole,
2-p-toluyl-4-methyl-5-hydroxymethylimidazole,
2-m-toluyl-4-methyl-5-hydroxymethylimidazole,
2-m-toluyl-4,5-bis(hydroxymethyl)imidazole, and
2-p-toluyl-4,5-bis(hydroxymethyl)imidazole.

Examples of acid anhydrides include a cyclic acid anhydride having a structure in which one or more water molecules are removed from two or more acids in the molecule, and the like.

Examples of cyclic anhydrides include dodecenyl succinic anhydride, polyadipic anhydride, polyazelaic anhydride, methyltetrahydrophthalic anhydride, methyl hexahydrophthalic anhydride, methyl himic anhydride, hexahydrophthalic anhydride, phthalic anhydride, pyromellitic anhydride, trimellitic anhydride, benzophenone tetracarboxylic acid anhydride, and the like.

From the viewpoint of compatibility between pot life and reactivity at the time of curing, the component (B) is preferably compounds that are solid in the epoxy resin at an atmospheric temperature of 25° C. and are liquid at the time of curing. Among them, dicyandiamide and imidazole are preferable, and it is preferable to include dicyandiamide for the component (B). In addition, it is more preferable to use dicyandiamide, and imidazole that is a solid at 25° C. in combination.

In a case where the component (B) is a solid in the epoxy resin at an atmospheric temperature of 25° C., reactivity with the epoxy resin at 25° C. is low, and storage stability becomes excellent. In particular, molding materials cured with dicyandiamide have excellent adhesiveness to reinforcement fibers. In addition, molding materials cured with imidazole have excellent heat resistance.

A content of the component (B) is preferably 5 to 40 parts by mass, and is more preferably 7 to 30 parts by mass with respect to 100 parts by mass of the component (A).

When the content of the component (B) is a preferable 5 parts by mass or more, and is a more preferable 7 parts by mass or more with respect to 100 parts by mass of the component (A), a sufficient curing rate can be obtained. When the content of the component (B) is a preferable 40 parts by mass or less, and is a more preferable 30 parts by mass or less with respect to 100 parts by mass of the component (A), a water absorption percentage of the fiber-reinforced composite material decreases, and heat resistance of the fiber-reinforced composite material does not easily decrease.

In a case of using a compound that is a solid in the epoxy resin at an atmospheric temperature of 25° C. and is liquid at the time of curing as the component (B), a content thereof is preferably 1 to 20 parts by mass, and is more preferably 3 to 10 parts by mass with respect to 100 parts by mass of the component (A).

When the content of this compound is the lower limit value within the above range or more, a sufficient curing rate can be obtained. When the content of this compound is the upper limit value within the above range or less, a water absorption percentage of the fiber-reinforced composite material decreases, and heat resistance of the fiber-reinforced composite material does not easily decrease.

When the component (B) is added as a viscosity improver, in addition to the above-mentioned alicyclic amines, phthalic anhydride or hydrogenated anhydride which may have a substituent is preferable from the viewpoint of excellent effects as a viscosity improver being exhibited.

In addition, from the viewpoint that a pot life of the molding material containing the above-mentioned epoxy resin composition can be extended, and storage stability at B-staging becomes favorable, tetrahydromethylphthalic anhydride is preferable in addition to alicyclic diamines including the above-described alicyclic diamines having one or two cyclohexane rings in a molecule.

Furthermore, from the viewpoint that a pot life of the molding material of the present invention can be extended, and storage stability at B-staging becomes favorable, tetrahydromethylphthalic anhydride is preferable in addition to a compound having an alicyclic skeleton in a molecule and in which an amino group is directly bonded to the alicyclic skeleton.

In particular, as the component (B), from the viewpoint that a pot life of the molding material of the present invention can be extended, and storage stability at B-staging becomes favorable, tetrahydromethylphthalic anhydride is preferable in addition to a primary amine having two alicyclic skeletons in the molecule.

In particular, in a case adding the component (B) as a viscosity improver, substances having the above-mentioned characteristics are preferable. Specific examples thereof include 3,3'-dimethyl-4,4'-diaminodicyclohexylmethane, 3,3'-diethyl-4,4'-diaminodicyclohexylmethane, bis(4-amino-3-methyl-5-ethylcyclohexyl)methane, 3,3',5,5'-tetramethyl-4,4'-diaminodicyclohexylmethane, 4,4'-diaminodicyclohexylmethane, and the like, which are described above. In addition, examples thereof include 3- or 4-methyl-1,2,3,6-tetrahydrophthalic anhydride, 3- or 4-methylhexahydrophthalic anhydride, and methyl-3,6-endomethylene-1,2,3,6-tetrahydrophthalic anhydride.

These may be used alone, or two or more kinds thereof may be used in combination.

A content of the component (B) in a case where it is added as a viscosity improver, is preferably a content in which an active hydrogen equivalent weight is 0.1 to 0.5, or a content in which an acid anhydride equivalent weight is 0.05 to 0.25; is more preferably a content in which an active hydrogen equivalent weight is 0.20 to 0.45, or a content in which an acid anhydride equivalent weight is 0.10 to 0.23; and is even more preferably a content in which an active hydrogen equivalent weight is 0.25 to 0.4, or a content in which an acid anhydride equivalent weight is 0.12 to 0.2, per a total amount (molar amount) of epoxy groups contained in the component (A) contained in the epoxy resin composition.

When the content of the component (B) is the lower limit value within the above range or more, B-staging (viscosity improvement) proceeds sufficiently. When the content of the component (B) is the upper limit value within the above range or less, flexibility of the molding material containing the viscosity-improved product of the epoxy resin composition does not excessively become hard, and fluidity does not excessively decrease at the time of heat compression molding.

(Component (C))

The component (C) in the molding material of one aspect of the present invention is a compound that has a solubility parameter of 11.2 or less and a melting point of 115° C. or lower. Hereinafter, the component (C) in the molding material of one aspect of the present invention, which is the compound that has a solubility parameter of 11.2 or less and a melting point of 115° C. or lower, will be referred to as a "first aspect of the component (C)" in some cases.

In addition, the component (C) in the molding material of another aspect of the present invention is a compound which is at least one of an ester compound having an alkyl group having 5 to 40 carbon atoms or a fatty alcohol having an alkyl group having 5 to 40 carbon atoms. Hereinafter, the component (C) in the molding material according to another aspect of the present invention, which is the compound which is at least one of an ester compound having an alkyl group having 5 to 40 carbon atoms or a fatty alcohol having an alkyl group having 5 to 40 carbon atoms, will be referred to as a "second aspect of the component (C)" in some cases.

The component (C) in the molding material of the present invention is a component which improves demoldability, from a mold, of the fiber-reinforced composite material obtained by subjecting the molding material of the present invention to heat compression molding; and which has a function as an internal mold release agent.

When molding a molding material (such as an SMC), an epoxy resin contained in the molding material is cured in a mold. Because epoxy resins have excellent adhesiveness to metals, cured products of epoxy resins tend to adhere to a mold. By using an internal mold release agent, it is possible to decrease adhesiveness at an interface between a mold and a cured product of an epoxy resin at the time of demolding. Epoxy resins have a property in which a viscosity is lowered temporarily until cured during a heat compression molding process, and viscous flow occurs. Accordingly, in a case of using an external mold release agent to improve demoldability, the mold release agent may flow out of the system due to the influence of resin viscous flow.

The component (C) migrates to an interface between a mold and the fiber-reinforced composite material during heat compression molding, and does not flow out of the system due to resin viscous flow during the heat compression molding.

A solubility parameter of the component (C) in the first aspect of the component (C) is 11.2 or less. In addition, a solubility parameter of the component (C) in the second aspect of the component (C) is preferably 11.2 or less. Furthermore, a solubility parameter of the component (C) in the first aspect of the component (C), and the component (C) in the second aspect of the component (C) is preferably 11.0 or less, and is more preferably 10.9 or less. Furthermore, a solubility parameter thereof is preferably 8.0 or more, is more preferably 8.7 or more, is even more preferably 8.8 or more, and is particularly preferably 8.9 or more.

Specifically, a solubility parameter of the component (C) is preferably 8.0 to 11.2, is more preferably 8.7 to 11.2, and is even more preferably 8.8 to 11.0. Particularly preferably, a solubility parameter thereof is 8.0 to 9.6 or 10.3 to 10.9, and is more preferably 8.9 to 9.6.

When the solubility parameter of the component (C) is within the above range, a rate of separation from the epoxy resin composition is appropriate during heat compression molding, and bleeding tends to easily occur at an interface between a mold and the fiber-reinforced composite material, and therefore demoldability of the fiber-reinforced composite material from the mold becomes excellent.

A melting point of the component (C) in the first aspect of the component (C) is 115° C. or lower. In addition, a melting point of the component (C) in the second aspect of the component (C) is preferably 115° C. or lower. Furthermore, a melting point of the component (C) in the first aspect of the component (C), and the component (C) in the second aspect of the component (C) is preferably −30° C. or higher.

Furthermore, a melting point of the component (C) is preferably −20 to 100° C., is more preferably −10 to 90° C., is even more preferably −5 to 80° C., and is particularly preferably 40 to 70° C. When the melting point of the component (C) is −30° C. or higher, is preferably −20° C. or higher, is more preferably −10° C. or higher, is even more preferably −5° C. or higher, and is particularly preferably 40° C. or higher, bleeding of the component (C) on a surface of the molding material is less likely to occur before heat compression molding, and the component (C) is less likely to flow with resin viscous flow at the time of the heat compression molding. Therefore, a decrease in concentration of the component (C) present at an interface between a mold and the fiber-reinforced composite material is suppressed, and demoldability of the fiber-reinforced composite material from the mold becomes excellent. When the inciting point of the component (C) is 115° C. or lower, is preferably 100° C. or lower, is more preferably 90° C. or lower, is even more preferably 80° C. or lower, and is particularly preferably 70° C. or lower, the component (C) is transferred to an interface between the mold and the molding material before the epoxy resin is cured, and thereby demoldability of the fiber-reinforced composite material from the mold becomes excellent.

Examples of component (C)s in the first aspect of the component (C) include ester compounds of a fatty acid and a fatty alcohol, ester compounds of a polyvalent carboxylic acid and a fatty alcohol, ester compounds of a polyhydric alcohol and a fatty acid, fatty alcohols, fatty acid amides, metal salts of fatty acids, and the like. A fatty chain may be a saturated fatty chain or an unsaturated fatty chain.

Specific examples thereof include ethylene glycol distearate, stearyl citrate, methyl stearate, myristyl myristate, behenyl alcohol, stearyl alcohol, bisphenol A ethylene glycol ether dilaurate, ethylenebis oleic amide, lauric acid amide, sorbitan monostearate, and the like.

From the viewpoint that demoldability from a mold becomes favorable because a high concentration of alkyl chains is present on a surface of the fiber-reinforced composite material, the component (C) in the first aspect of the component (C) is preferably at least one of an ester compound having an alkyl group having 5 to 40 carbon atoms and a fatty alcohol having an alkyl group having 5 to 40 carbon atoms; and the component (C) in the second aspect of the component (C) is at least one of an ester compound having an alkyl group having 5 to 40 carbon atoms and a fatty alcohol having an alkyl group having 5 to 40 carbon atoms.

As the component (C) in the first aspect of the component (C) and the component (C) in the second aspect of the component (C), an ester compound having an alkyl group having 10 to 30 carbon atoms is more preferable, and an ester compound having an alkyl chain of 12 to 20 carbon atoms is even more preferable.

Specific examples thereof include an ester compound having a long chain alkyl group as shown in the following chemical formula.

[Chem. 2]

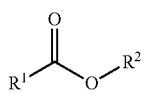

In the above chemical formula, $R^1$ and $R^2$ each represent the same or different alkyl groups, and at least one of $R^1$ and $R^2$ is an alkyl group having 5 to 40 carbon atoms.

As the component (C), from the viewpoint that demodability of the fiber-reinforced composite material from a mold is favorable, and almost no contamination of a mold surface occurs at the time of demolding, an aliphatic compound having a hydroxyl group is particularly preferable, a sorbitan fatty acid ester is more preferable, and a sorbitan monostearate as shown in the following chemical formula is particularly preferable.

[Chem. 3]

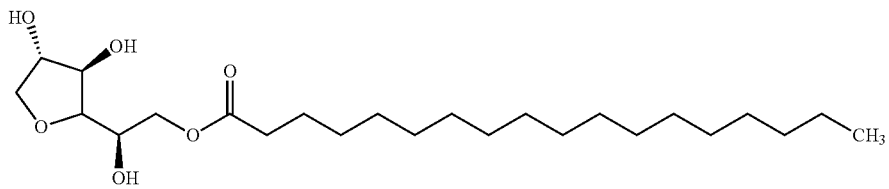

A content of the component (C) is preferably 0.1 to 10 parts by mass, is more preferably 0.1 to 7 parts by mass, is even more preferably 0.3 to 6 parts by mass, and is particularly preferably 0.5 to 5 parts by mass with respect to 100 parts by mass of the component (A).

When the content of the component (C) is preferably 0.1 parts by mass or more, is more preferably 0.3 parts by mass or more, and is particularly preferably 0.5 parts by mass or more with respect to 100 parts by mass of the component (A), demoldability of the fiber-reinforced composite material from a mold becomes excellent. When the content of the component (C) is preferably 10 parts by mass or less, is more preferably 7 parts by mass or less, is even more preferably 6 parts by mass or less, and is particularly preferably 5 parts by mass or less with respect to 100 parts by mass of the component (A), demoldability of the fiber-reinforced composite material from a mold becomes easily compatible with heat resistance of the fiber-reinforced composite material.

(Other Components)

Examples of other components that may be contained in the epoxy resin composition contained in the molding material of the present invention as necessary include curing accelerators, inorganic filling materials, organic pigments, inorganic pigments, and the like, other than the above-described component (A), component (B), and component (C).

A curing accelerator is preferably used for the following reasons.

By using the component (B) in combination with an appropriate curing accelerator, it is possible to lower a reaction start temperature without significantly impairing storage stability, and thereby it is possible to cure a molding material in a short time. In addition, it is possible to improve mechanical properties (bending strength and bending modulus of elasticity) and heat properties (heat resistance) of the fiber-reinforced composite material.

As the curing accelerator, a urea compound is preferable from the viewpoint that mechanical properties (bending strength and bending modulus of elasticity) of the fiber-reinforced composite material become excellent.

Examples of urea compounds include 3-phenyl-1,1-dimethylurea, 3-(3,4-dichlorophen yl)-1,1-dimethyl urea, 3-(3-chloro-4-methylphenyl)-1,1-dimethyl urea, 2,4-bis(3,3-dimethylureido)toluene, 1,1'-(4-methyl-1,3-phenylene)bis(3,3-dimethylurea), and the like.

Examples of inorganic filling materials include calcium carbonate, aluminum hydroxide, clay, barium sulfate, magnesium oxide, glass powders, hollow glass beads, aerosil, and the like.

(Method for Preparing Epoxy Resin Composition)

The epoxy resin composition contained in the molding material of the present invention can be prepared by a known method of the related art. For example, the composition may be prepared by mixing each component at the same time, or it may be prepared by preparing masterbatches in which the component (B), the component (C), and the like are appropriately dispersed in the component (A) in advance and using them. In a case where a temperature in the system rises due to shear heat generation due to kneading, and the like, it is preferable not to raise a temperature during kneading by adjusting a kneading speed, by water-cooling a kneading pot, and the like.

Examples of kneading devices include a grinding machine, an attritor, a planetary mixer, a dissolver, a three-roll mill, a kneader, a universal stirrer, a homogenizer, a homo dispenser, a ball mill, and a bead mill. Two or more kinds of kneading devices may be used in combination.

(Use Application of Epoxy Resin Composition)

The epoxy resin composition contained in the molding material of the present invention is suitable as a matrix resin of the molding material that is an intermediate material used for manufacturing a fiber-reinforced composite material, particularly a matrix resin for an SMC and a matrix resin for a bulk molding compound (hereinafter also referred to as a "BMC").

Because the epoxy resin composition contained in the molding material of the present invention has a low viscosity and favorable impregnating ability, it can also be used as a matrix resin composition in a molding material of a fiber-reinforced composite material in a resin transfer molding manufacturing method.

(Function Effect of Epoxy Resin Composition)

Despite the fact that the epoxy resin composition contained in the molding material of the present invention described above contains an epoxy resin having excellent adhesiveness to a mold, demolding of the fiber-reinforced composite material from a mold is easy, a surface appearance of the fiber-reinforced composite material is not impaired, and there are very few mold contaminants.

In addition, by using this epoxy resin composition, it is possible to obtain the molding material in which B-staging is easy, a pot life is long, and workability and storage stability become favorable after B-staging, and mechanical properties and heat resistance are excellent.

(Viscosity-Improved Product of Epoxy Resin Composition)

The epoxy resin composition contained in the molding material of the present invention may be a viscosity-improved product of the epoxy resin composition. In other words, the molding material of the present invention may contain a viscosity-improved product of the above-mentioned epoxy resin composition, instead of the above-mentioned epoxy resin composition.

The viscosity-improved product of the epoxy resin composition is a product obtained by improving a viscosity of the epoxy resin composition contained in the molding material of the present invention, that is, a B-staged product.

The viscosity-improved product of the epoxy resin composition is obtained as follows for example.

After impregnating a reinforcement fiber substrate with the above-mentioned epoxy resin composition by a known method suitable for a form of the reinforcement fiber substrate, by maintaining the substrate for several hours to several days at a temperature of room temperature to about 80° C., or for several seconds to several minutes at a temperature of about 80 to 200° C., an epoxy group contained in the component (A) in the epoxy resin composition reacts with the component (B), and thereby the epoxy resin composition is B-staged.

Conditions for the reaction of the epoxy group contained in the component (A) with and the component (B) are preferably selected such that a viscosity, at 23° C., of the viscosity-improved product of the epoxy resin composition obtained after the reaction is within a range to be described below.

A viscosity of the viscosity-improved product of the epoxy resin composition at 23° C. is preferably 3000 to 150000 Pa·s, and is more preferably 5000 to 300000 Pa·s.

When the viscosity of the viscosity-improved product of the epoxy resin composition at 23° C. is the lower limit value within the above range or more, tackiness of a surface decreases at the time of handling the molding material. When the viscosity of the viscosity-improved product of the epoxy resin composition at 23° C. is the upper limit value within the above range or less, viscous flow characteristics at the time of heat compression molding become favorable.

The viscosity of the viscosity-improved product of the epoxy resin composition at 23° C. is measured using a B-type viscometer.

The viscosity-improved product of the epoxy resin composition is preferably a viscosity-improved product that contains a component (A): an epoxy resin; a component (B'): a compound having a partial structure represented by Formula (3); a component (B): an epoxy resin curing agent (excluding the component (B')); and a component (C): a compound that has a solubility parameter of 11.2 or less and a melting point of 115° C. or lower.

In addition, as another aspect, the viscosity-improved product of the epoxy resin composition is preferably a viscosity-improved product that contains a component (A): an epoxy resin; a component (B'): a compound having a partial structure represented by Formula (3); a component (B): an epoxy resin curing agent (excluding the component (B')); and a component (C): a compound which is at least one of an ester compound having an alkyl group having 5 to 40 carbon atoms or a fatty alcohol having an alkyl group having 5 to 40 carbon atoms.

Furthermore, as still another aspect, the viscosity-improved product of the epoxy resin composition is preferably a viscosity-improved product that contains a component (A1): an aromatic epoxy resin; a component (A2): an aliphatic epoxy resin; a component (B'): a compound having a partial structure represented by Formula (3); a component (B): an epoxy resin curing agent (excluding the component (B')); and a component (C): a compound that has a solubility parameter of 11.2 or less and a melting point of 115° C. or lower.

Furthermore, as even still another aspect, the viscosity-improved product of the epoxy resin composition is preferably a viscosity-improved product that contains a component (A1): an aromatic epoxy resin; a component (A2): an aliphatic epoxy resin; a component (B'): a compound having a partial structure represented by Formula (3); a component (B): an epoxy resin curing agent (excluding the component (B')); and a component (C): a compound which is at least one of an ester compound having an alkyl group having 5 to 40 carbon atoms or a fatty alcohol having an alkyl group having 5 to 40 carbon atoms.

[Chem. 4]

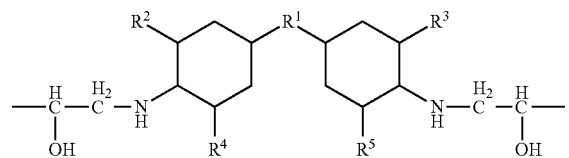

(3)

$R^1$ is a single bond, a methylene group, —C(CH$_3$)$_2$—, —O—, or —SO$_2$—; and $R^2$, $R^3$, $R^4$, and $R^5$ each independently represent a hydrogen atom or an alkyl group having 1 to 4 carbon atoms.

The component (A1) in the preferred viscosity-improved product of the epoxy resin composition is preferably a liquid aromatic epoxy resin having a viscosity of 0.3 Pa·s or more at 25° C. from the viewpoint that mechanical properties (bending strength and bending modulus of elasticity) and heat properties (heat resistance) of the fiber-reinforced composite material tend to become favorable.

The viscosity of the epoxy resin at 25° C. is measured using an E-type viscometer.

(Reinforcement Fiber)

As reinforcement fibers, various fibers can be used according to use applications and the purpose of use of the molding material. Examples thereof include carbon fibers (including graphite fibers, the same applies hereinafter), aramid fibers, silicon carbide fibers, alumina fibers, boron fibers, tungsten carbide fibers, glass fibers, and the like. From the viewpoint of mechanical properties of the fiber-reinforced composite material, carbon fibers and glass fibers are preferred, and carbon fibers are particularly preferred.

The reinforcement fibers are generally used in a form of a reinforcement fiber bundle consisting of single fibers within the range of 1000 or more and 60000 or less.

In the molding material, the reinforcement fibers may be present while maintaining a shape of a reinforcement fiber bundle, or the reinforcement fibers may be present in a state of being divided into a bundle consisting of lesser fibers. In an SMC and a BMC, they generally present in a state of being divided into a bundle consisting of lesser fibers.

As reinforcement fibers in an SMC or a BMC, a chopped reinforcement fiber bundle composed of short fibers is preferable.

A length of short fibers is preferably 0.3 to 10 cm, and is more preferably 1 to 5 cm.

When the length of the short fibers is 0.3 cm or longer, a fiber-reinforced composite material having favorable mechanical properties can be obtained. When the length of the short fibers is 10 cm or shorter, an SMC and a BMC having favorable viscous flow characteristics at the time of heat compression molding can be obtained.

As the reinforcement fiber substrate in a SMC, a sheet-like material in which chopped reinforcement fiber bundles are two-dimensionally randomly stacked is more preferable.

(SMC)

An SMC, which is the molding material of the present invention, is manufactured by, for example, sufficiently impregnating a sheet-like material of the chopped reinforcement fiber bundle with the above-mentioned epoxy resin composition, and improving a viscosity of the epoxy resin composition as necessary.

As a method of impregnating a sheet-like material of the chopped reinforcement fiber bundle with the epoxy resin composition, various known methods of the related art can be adopted.

Examples thereof include the following method.

Two films to which the epoxy resin composition is uniformly applied are prepared. The chopped reinforcement fiber bundle is spread on an epoxy-resin-composition-applied surface of one film in a random order to form a sheet-like material. An epoxy-resin-composition-applied surface of the other film is laminated on the sheet-like material, the epoxy resin composition is pressure bonded to the sheet-like material, and thereby the sheet-like material is impregnated therewith. Thereafter, by improving a viscosity of the epoxy resin composition, tackiness of an SMC surface is suppressed, and thereby an SMC suitable for a molding operation is obtained.

(BMC)

A BMC, which is the molding material of the present invention, is manufactured by, for example, sufficiently mixing a chopped reinforcement fiber bundle with the above-mentioned epoxy resin composition to make the mixture into a bulk shape, and improving a viscosity of the epoxy resin composition as necessary.

As a method of mixing the chopped reinforcement fiber bundle and the epoxy resin composition to make the mixture into a bulk shape, various methods known in the related art can be adopted. From the viewpoint of an impregnating ability of an epoxy resin composition into a chopped reinforcement fiber bundle, dispersibility or the like of fibers, and productivity, a method of mixing by a pressure kneader is preferable.

Mixing by the pressure kneader may be performed while heating, if necessary. A heating temperature is preferably equal to or lower than a temperature at which an epoxy resin starts to be cured, and is more preferably 10 to 35° C. A pressure at the time of mixing by the pressure kneader is not particularly required to be equal to or higher than atmospheric pressure, but a pressure may be equal to or higher than atmospheric pressure in a case where a viscosity of the epoxy resin composition is high, because in this case, the epoxy resin composition absorbs air and is kneaded therewith, and it becomes difficult to impregnated a chopped reinforcement fiber bundle with the epoxy resin composition.

After obtaining a bulky material, by improving a viscosity of the epoxy resin composition, tackiness of a BMC surface is suppressed, and thereby a BMC suitable for a molding operation is obtained.

(Function Effect)

Since the molding material of the present invention described above contains the above-mentioned epoxy resin composition or a viscosity-improved product thereof, and the reinforcement fibers, it is possible to obtain a fiber-reinforced composite material having excellent demoldability from a mold, and mechanical properties and heat resistance.

<Fiber-Reinforced Composite Material>

The fiber-reinforced composite material of the present invention is a cured product of the molding material of the present invention.

The fiber-reinforced composite material of the present invention is manufactured by heat-molding a molding material such as an SMC and a BMC, and curing the epoxy resin composition contained in the molding material of the present invention or curing a viscosity-improved product of the epoxy resin contained in the molding material of the present invention.

Examples of methods of manufacturing the fiber-reinforced composite material formed of an SMC include the following method.

One SMC or a stack of a plurality of SMCs is set between a pair of molds. The SMC is heat-compressed at 120 to 230° C. for 2 to 60 minutes to cure the epoxy resin composition, and thereby a fiber-reinforced composite material which is a molded article is obtained.

The SMC may be disposed on both sides or one side thereof with a honeycomb structure such as cardboard used as a core material.

Examples of methods of manufacturing the fiber-reinforced composite material formed of a BMC include methods by compression molding, transfer molding, injection molding, and the like.

The epoxy resin composition contained in the molding material of the present invention has a high viscosity in the vicinity of room temperature in many cases. Accordingly, even a molded article of a complicated shape can be manufactured in a short time by adopting a method by compression molding, in which after a BMC is pressed to be inserted into a mold of a predetermined shape, and the like, the BMC is heat-compressed to cure the epoxy resin composition.

(Function Effect)

The fiber-reinforced composite material of the present invention described above is a cured product of the molding material of the present invention, and thus has excellent demoldability from a mold, and mechanical properties and heat resistance.

OTHER EMBODIMENTS

The present invention is not limited to the above-described embodiments, and various modifications are possible within the range of matters described in the scope of the claims. Embodiments obtained by appropriately combining the technical means shown in the above-described embodiments to different embodiments are also included in the technical scope of the present invention.

EXAMPLES

Hereinafter, the present invention will be more specifically described based on examples, but the present invention is not limited thereto.

<Each Component>

(Component (A))

jER (registered trademark) 827: Bisphenol A type liquid epoxy resin (manufactured by Mitsubishi Chemical Corporation, viscosity at 25° C.: 10 Pa·s)

jER (registered trademark) 828: Bisphenol A type liquid epoxy resin (manufactured by Mitsubishi Chemical Corporation, viscosity at 25° C.: 15 Pa·s)

YED216M: 1,6-Hexanediol diglycidyl ether (manufactured by Mitsubishi Chemical Corporation, viscosity at 25° C.: 0.018 Pa·s)

jER (registered trademark) 630: Triglycidyl-p-aminophenol (manufactured by Mitsubishi Chemical Corporation, viscosity at 25° C.: 0.7 Pa·s)

TETRAD-X: N,N,N',N'-tetraglycidyl-m-xylylene diamine (MITSUBISHI GAS CHEMICAL COMPANY, INC., viscosity at 25° C.: 2.3 Pa·s)

(Component B)

jERCURE (registered trademark) 113: 3,3'-Dimethyl-4,4'-diaminodicyclohexylmethane (manufactured by Mitsubishi Chemical Corporation)

HN-2200: Tetrahydro methylphthalic anhydride (manufactured by Hitachi Chemical Co., Ltd.)

DICYANEX 1400F: Dicyandiamide (manufactured by Air Products and Chemicals, Inc.)

2MZA-PW: 2,4-Diamino-6-[2'-methylimidazolyl-(1')]-ethyl-s-triazine (2MZA-PW manufactured by SHIKOKU CHEMICALS CORPORATION)

(Component (C) and Other Internal Mold Release Agents)

As the component (C) and other internal mold release agents, the following were prepared.

TABLE 1

| Product name | Manufacturer | Chemical name | Solubility parameter | Melting point (° C.) |
|---|---|---|---|---|
| EMANON 3201M-V | Kao Corporation | Ethyleneglycol distearate | 8.9 | 62 |
| Rikester EW-90 | RIKEN VITAMIN CO., LTD. | Stearyl citrate | 9.3 | 48 |
| KALCOL 220-80 | Kao Corporation | Behenyl alcohol | 9.3 | 54 |
| KALCOL 8098 | Kao Corporation | Stearyl alcohol | 9.5 | 56 |
| EXCEPARL BP-DL | Kao Corporation | Bisphenol A ethylene glycol ether dilaurate | 9.6 | −20 |
| SLIPACKS O | Nihon Kasei CO., LTD | Ethylenebis oleamide | 9.6 | 71 |
| DIAMID Y | Nihon Kasei CO., LTD | Lauramide | 10.4 | 66 |
| EXCEPARL MY-M | Kao Corporation | Myristyl myristate | 8.6 | 42 |
| Methyl Stearate (C18) | Tokyo Chemical Industry Co., Ltd. | Methyl stearate | 8.6 | 37 |
| ZINC STEARATE | NOF CORPORATION | Zinc stearate | 8.9 | 121 |
| DIAMID KH | Nihon Kasei CO., LTD | Hydroxystearamide (oleic acid solution added) | 11.4 | 79 |

TABLE 1-continued

| Product name | Manufacturer | Chemical name | Solubility parameter | Melting point (° C.) |
|---|---|---|---|---|
| RHEODOL SP-S10V | Kao Corporation | Sorbitan monostearate | 10.9 | 41 |

Measurement of a melting point of the component (C) and the other internal mold release agents was performed using a DSC device (Q1000 manufactured by TA Instruments).

A test substance was weighed on a device standard hermetic aluminum pan and covered with a device standard aluminum lid to prepare a sample. A temperature was raised from 30° C. to 300° C. at 10° C./min to obtain a DSC heating curve. On the DSC heating curve, a temperature corresponding to an intersection of a baseline at an endothermic start side, and a tangent line of an inflection point at the lowest temperature peak occurring due to a melting point was used as a melting point.

(Preparation of Masterbatch)

DICYANEX 1400F and 2MZA-PW, the component (C), and agents that are solid at room temperature among the other internal mold release agents were respectively mixed with jER (registered trademark) 827 (or jER 828) at a mass ratio of 1:1. The mixture was kneaded with a three-roll mill to obtain masterbatches of each component.

<Preparation of Epoxy Resin Composition>

Example 1

To obtain a composition as shown in Table 2, masterbatches of DICYANEX 1400F, masterbatches of 2MZA-PW, and masterbatches of EMANON 3201M-V; jER (registered trademark) 827; and YED216M were kneaded using a three-one motor. Thereafter, a predetermined amount of jERCURE (registered trademark) 113 was added thereto, and the mixture was kneaded again to obtain an epoxy resin composition.

Examples 2 to 12 and Comparative Examples 1 to 3

An epoxy resin composition was obtained in the same manner as in Example 1 except that each component was blended in to obtain compositions shown in Tables 2 to 4.

Example 13

To obtain a composition as shown in Table 5, masterbatches of DICYANEX 1400F, masterbatches of 2MZA-PW, and masterbatches of RHEODOL SP-S10V; jER (registered trademark) 827; and YED216M were kneaded using a three-one motor. Thereafter, a predetermined amount of jERCURE (registered trademark) 113 was added thereto, and the mixture was kneaded again to obtain an epoxy resin composition.

Examples 14 to 21

An epoxy resin composition was obtained in the same manner as in Example 13 except that each component was blended in to obtain a composition shown in Table 5.

Examples 22 to 23

To obtain a composition as shown in Table 6, masterbatches of DICYANEX 1400F, masterbatches of 2MZA- PW, and masterbatches of RHEODOL SP-S10V; jER (registered trademark) 828; and TETRAD-X were kneaded using a three-one motor. Thereafter, a predetermined amount of HN-2200 was added thereto, and the mixture was kneaded again to obtain an epoxy resin composition.

<Manufacture of BMC>

BMC was produced using the epoxy resin compositions obtained in Examples 1 to 7 and 13 to 15 and Comparative Examples 1 and 2.

A BMC was obtained by sufficiently kneading a chopped carbon fiber bundle obtained by cutting a carbon fiber bundle (TR50S 15 L, manufactured by Mitsubishi Chemical Corporation) having 15000 filaments into a length of 25 mm with the epoxy resin composition obtained in each example or comparative example. A mass of the carbon fibers was about 30 parts by mass with respect to 100 parts by mass of the epoxy resin composition.

<Manufacture of SMC>

The epoxy resin compositions obtained in Examples 8 to 12 and 16 to 23 and Comparative Example 3 were applied on a polyethylene carrier film using a doctor blade such that an amount became 600 g/m$^2$.

The same chopped carbon fiber bundle as that used in the manufacture of BMC was sandwiched between two carrier films such that the epoxy resin composition side was located inside thereof. This was pressed between the rolls to impregnate the chopped carbon fiber bundle with the epoxy resin composition. Thereby, a SMC precursor was obtained. A viscosity of the epoxy resin composition in the SMC precursor was sufficiently improved by allowing the SMC precursor to stand at room temperature (23° C.) for 168 hours. Thereby, an SMC was obtained in which the chopped carbon fiber bundle was favorably impregnated with the epoxy resin composition. An amount of carbon fiber in the SMC was 1200 g/m$^2$ (a content of carbon fibers in 100% by mass of SMC is about 50% by mass).

<<Manufacture of Fiber-Reinforced Composite Material>>

A 30 cm square top-and-bottom-paired flat sheet mold, which had been treated with chrome plating, was heated to 140° C., and a surface of the top-and-bottom-paired mold was airbrushed with an external mold release agent (Free Release 65 manufactured by Neos Corporation) using a spray gun. The BMCs or SMCs obtained in the above-mentioned manufacture of BMC or manufacture of SMC were 2-ply laminated, charged into the mold at about a 60% charge ratio (a ratio of an area of SMC to a mold area), and heat-compressed for 5 minutes under conditions of a mold temperature of 140° C. and a pressure of 8 MPa. Thereby, the epoxy resin composition was cured, and a 300 mm square flat-shaped fiber-reinforced composite material (a CFRP molded sheet) having a thickness of about 2 mm was obtained.

(Evaluation of Demoldability)

When taking out the CFRP molded sheet from the mold, a suction cup (Suction Cup 2 Finger manufactured by Yamaoka Enterprise) was closely attached to a surface of the CFRP molded sheet, and the sheet was demolded by being manually pulled up in a vertical direction. In a case where the sheet could not be demolded by the suction cup, it was demolded by being pushed up by a hydraulic ejector pin. Demoldability was evaluated based on the following criteria.

The results are shown in Tables 2 to 6.

A: The sheet could be easily demolded by the suction cup.
B: The sheet could be relatively easily demolded by the suction cup.
C: The sheet could not be demolded by the suction cup. It was demolded by the hydraulic ejector pin.

(Evaluation of Heat Resistance)

The CFRP molded sheet was cut into a length of 55 mm and a width of 12.7 mm to prepare a test piece. The test piece was measured using a dynamic viscoelasticity measuring device (Q800 manufactured by TA Instruments) under measurement conditions of a frequency of 1 Hz, a temperature-increasing rate of 5° C./min, and a both-end bending mode. A temperature at which a temperature-tan δ curve shows the maximum value was used as a glass transition temperature (Tg). In CFRP, as the Tg becomes higher, the heat resistance becomes excellent, and as rigidity becomes larger at the mold temperature, the demoldability becomes excellent.

The results are shown in Tables 2 to 6.

(Evaluation of Bending Characteristics)

Bending characteristics of the CFRP molded sheet made from the SMC were evaluated.

The CFRP molded sheet was cut into a length of 110 mm and a width of 25 mm, and a cut surface was treated with a sandpaper #1200 to prepare a test piece. A bending test was performed on the test piece under the environment of a temperature of 23° C. and a humidity of 50% RH with a 3-point bending jig by using a universal tester (Instron (registered trademark) 4465 manufactured by Instron) and analysis software, Bluehill. A bending strength (MPa) and a bending modulus of elasticity (GPa) were calculated.

A total of 12 test pieces were used for measurement, and an average value thereof was adopted.

Measurement conditions are shown below.

D is a thickness of the test piece, L is a distance between supports.

The results are shown in Tables 3 to 6.

Measurement conditions: Indenter R=3.2; Support R=1.6; Support distance L [mm]=40×D; Cross-head speed [mm/min]=0.01×L×L/6/D (Evaluation of Exterior of Molded Sheet)

An exterior of the CFRP molded sheets of Examples 13 to 23 were evaluated according to the following criteria.

The results are shown in Tables 5 and 6.

A: The exterior of the molded sheet was excellent because no bleeding of an internal release agent or the like was observed on the exterior.
B: A defect in the exterior was caused due to a small amount of bleeding of an internal mold release agent on the exterior of the molded sheet.
C: A defect in the exterior was caused due to a large amount of bleeding of an internal mold release agent on the exterior of the molded sheet.

(Evaluation of Mold Contamination)

Contamination of a mold surface after taking out the CFRP molded sheets of Examples 13 to 23 from the mold was evaluated based on the following criteria.

The results are shown in Tables 5 and 6.

A: Almost no contaminants were transferred to the mold even in a case of continuous molding.
B: Contaminants were slightly transferred to the mold, and in a case of continuous molding, contaminants on the mold increased.
C: The mold was contaminated after molding of one time.

TABLE 2

| | | Example | | | | | | |
|---|---|---|---|---|---|---|---|---|
| | | 1 | 2 | 3 | 4 | 5 | 6 | 7 |
| | Form | BMC | BMC | BMC | BMC | BMC | BMC | BMC |
| Component (A) | jER 827 | 85 | 85 | 85 | 85 | 85 | 85 | 85 |
| | YED216M | 15 | 15 | 15 | 15 | 15 | 15 | 15 |
| | jER 630 | | | | | | | |
| Component (B) | jERCURE 113 | 11.2 | 11.2 | 11.2 | 11.2 | 11.2 | 11.2 | 11.2 |
| | DICYANEX 1400F | 4 | 4 | 4 | 4 | 4 | 4 | 4 |
| | 2MZA-PW | 4 | 4 | 4 | 4 | 4 | 4 | 4 |
| Component (C) | EMANON 3201M-V | 5 | | | | | | |
| | Rikester EW-90 | | 5 | | | | | |
| | KALCOL 220-80 | | | 5 | | | | |
| | KALCOL 8098 | | | | 5 | | | |
| | EXCEPARL BP-DL | | | | | 5 | | |
| | SLIPACKS O | | | | | | 5 | |
| | DIAMID Y | | | | | | | 5 |
| Other internal mold release agents | ZINC STEARATE | | | | | | | |
| | DIAMID KH | | | | | | | |
| Carbon fiber | TR50S 15L | 53 | 53 | 53 | 53 | 53 | 53 | 53 |
| | Demoldability | A | A | A | A | A | B | B |
| Heat resistance | Tg (° C.) | 124 | 123 | 126 | 126 | 129 | 128 | 119 |
| Bending characteristics | Bending strength (MPa) | — | — | — | — | — | — | — |
| | Bending modulus of elasticity (GPa) | — | — | — | — | — | — | — |

TABLE 3

| | | Example | | | | |
|---|---|---|---|---|---|---|
| | | 8 | 9 | 10 | 11 | 12 |
| | Form | SMC | SMC | SMC | SMC | SMC |
| Component (A) | jER 827 | 85 | 85 | 85 | 25 | 85 |
| | YED216M | 15 | 15 | 15 | 5 | 15 |
| | jER 630 | | | | 70 | 15 |
| Component (B) | jERCURE 113 | 11.2 | 11.2 | 11.2 | 13.2 | 11.2 |
| | DICYANEX 1400F | 4 | 4 | 4 | 4 | 4 |
| | 2MZA-PW | 4 | 4 | 4 | 4 | 4 |
| Component (C) | EMANON 3201M-V | 5 | 3 | 1 | 3 | |
| | Rikester EW-90 | | | | | |
| | KALCOL 220-80 | | | | | |
| | KALCOL 8098 | | | | | |
| | EXCEPARL BP-DL | | | | | 5 |
| | SLIPACKS O | | | | | |
| | DIAMID Y | | | | | |
| Other internal mold release agents | ZINC STEARATE | | | | | |
| | DIAMID KH | | | | | |
| Carbon fiber | TR50S 15L | 124 | 124 | 124 | 124 | 124 |
| | Demoldability | A | A | B | A | A |
| Heat resistance | Tg (° C.) | 133 | 136 | 144 | 213 | 132 |
| Bending characteristics | Bending strength (MPa) | 175 | 173 | 254 | 250 | 219 |
| | Bending modulus of elasticity (GPa) | 14 | 14 | 18 | 21 | 17 |

TABLE 4

| | | Comparative Example | | |
|---|---|---|---|---|
| | | 1 | 2 | 3 |
| | Form | BMC | BMC | BMC |
| Component (A) | jER 827 | 85 | 85 | 85 |
| | YED216M | 15 | 15 | 15 |
| | jER 630 | | | |
| Component (B) | jERCURE 113 | 11.2 | 11.2 | 11.2 |
| | DICYANEX 1400F | 4 | 4 | 4 |
| | 2MZA-PW | 4 | 4 | 4 |
| Component (C) | EMANON 3201M-V | | | |
| | Rikester EW-90 | | | |
| | KALCOL 220-80 | | | |
| | KALCOL 8098 | | | |
| | EXCEPARL BP-DL | | | |
| | SLIPACKS O | | | |
| | DIAMID Y | | | |
| Other internal mold release agents | ZINC STEARATE | 5 | | |
| | DIAMID KH | | 5 | |
| Carbon fiber | TR50S 15L | 53 | 53 | 124 |
| | Demoldability | C | C | C |
| Heat resistance | Tg (° C.) | 136 | 123 | 149 |
| Bending characteristics | Bending strength (MPa) | — | — | 251 |
| | Bending modulus of elasticity (GPa) | — | — | 18 |

TABLE 5

| | | Example | | | | | | | | |
|---|---|---|---|---|---|---|---|---|---|---|
| | | 13 | 14 | 15 | 16 | 17 | 18 | 19 | 20 | 21 |
| | Form | BMC | BMC | BMC | SMC | SMC | SMC | SMC | SMC | SMC |
| Component (A) | jER 827 | 85 | 85 | 85 | 25 | 25 | 25 | 50 | 50 | 50 |
| | YED216M | 15 | 15 | 15 | 5 | 5 | 5 | 15 | 15 | 15 |
| | jER 630 | | | | 70 | 70 | 70 | 35 | 35 | 35 |
| Component (B) | jERCURE 113 | 11.2 | 11.2 | 11.2 | 13.2 | 13.2 | 13.2 | 12.3 | 12.3 | 12.3 |
| | DICYANEX 1400F | 4 | 4 | 4 | 4 | 4 | 4 | 4 | 4 | 4 |
| | 2MZA-PW | 4 | 4 | 4 | 4 | 4 | 4 | 4 | 4 | 4 |
| Component (C) | RHEODOL SP-S10V | 5 | | | 3 | 2 | 1 | 3 | 2 | 1 |
| | Methyl (C1) Stearate (C18) | | 5 | | | | | | | |
| | EXCEPARL MY-M | | | 5 | | | | | | |
| Carbon fiber | TR50S 15L | 53 | 53 | 53 | 124 | 124 | 124 | 124 | 124 | 124 |
| Evaluation | Evaluation of demoldability | A | B | B | A | A | A | A | A | A |
| | Evaluation of exterior of molded product | A | B | B | A | A | A | A | A | A |
| | Evaluation of mold contamination | A | A | A | A | A | A | A | A | A |
| Heat resistance | Tg (° C.) | 130 | 116 | 136 | 206 | 208 | 213 | 160 | 163 | 168 |
| Evaluation of bending characteristics | Bending strength (MPa) | — | — | — | 245 | 276 | 288 | 269 | 276 | 313 |
| | Bending modulus of elasticity (GPa) | | | | 20 | 22 | 23 | 21 | 20 | 24 |

TABLE 6

| | | Example | |
|---|---|---|---|
| | | 22 | 23 |
| | Form | SMC | SMC |
| Component (A) | jER 828 | 95 | 95 |
| | TETRAD-X | 5 | 5 |
| Component (B) | HN-2200 | 13.7 | 13.7 |
| | DICYANEX 1400F | 1 | 2 |
| | 2MZA-PW | 6 | 5 |
| Component (C) | RHEODOL SP-S10V | 1 | 1 |
| Carbon fiber | TR50S 15L | 122 | 122 |
| Evaluation | Evaluation of demoldability | A | A |
| | Evaluation of exterior of molded product | A | A |
| | Evaluation of mold contamination | A | A |
| Heat resistance | Tg (° C.) | 167 | 160 |
| Evaluation of bending characteristics | Bending strength (MPa) | 233 | 268 |
| | Bending modulus of elasticity (GPa) | 20 | 22 |

INDUSTRIAL APPLICABILITY

Compared to molding materials of the related art, in particular to SMCs of the related art, the molding material of the present invention is excellent from the viewpoint that demoldability of a fiber-reinforced composite material formed of the molding material is excellent, a mold occupancy time of SMC at the time of molding is short, and a favorable molded article of the fiber-reinforced composite material is obtained. In addition, the molding material of the present invention has the same level of workability, moldability, and pot life as those of SMCs of the related art, and has excellent storage stability after a reinforcement fiber substrate is impregnated therewith.

An SMC having an epoxy resin composition contained in the molding material of the present invention as a matrix resin has excellent impact resistance, excellent heat resistance, a high bending strength and a high bending modulus of elasticity, which are specific properties of an epoxy resin. Therefore, it is preferably used as a raw material for industrial and automotive structural parts.

The invention claimed is:

1. A molding material, comprising:
    a matrix resin composition; and
    a reinforcement fiber mixed with the matrix resin composition,
    wherein the matrix resin composition is an epoxy resin composition that comprises:
        a component (A): an epoxy resin;
        a component (B): an epoxy resin curing agent; and
        a component (C): a compound selected from the group consisting of ester compounds of a fatty acid and a fatty alcohol, ester compounds of a polyvalent carboxylic acid and a fatty alcohol, ester compounds of a polyhydric alcohol and a fatty acid, fatty alcohols, and metal salts of fatty acids, wherein the compound has a solubility parameter of 11.2 or less and a melting point of 115° C. or lower.

2. The molding material according to claim 1, wherein at least one kind of compounds contained for the component (C) is a compound having a solubility parameter of 8.0 to 9.6, or 10.3 to 10.9.

3. The molding material according to claim 1, wherein at least one kind of compounds contained for the component (C) is a compound having a melting point of −30° C. or higher and 115° C. or lower.

4. The molding material according to claim 1, wherein at least one kind of epoxy resin curing agents contained for the component (B) is at least one of a polyamine-based compound and an acid anhydride-based compound.

5. The molding material according to claim 1, wherein at least one kind of epoxy resin curing agents contained for the component (B) is an alicyclic diamine.

6. The molding material according to claim 1, wherein at least one kind of epoxy resin curing agents contained for the component (B) is dicyandiamide.

7. The molding material according to claim 1, wherein the reinforcement fiber is a carbon fiber.

8. The molding material according to claim 1, which is a sheet molding compound.

9. A fiber-reinforced composite material which is a cured product of the molding material according to claim 1.

10. A molding material, comprising:
a matrix resin composition; and
a reinforcement fiber impregnated with the matrix resin composition,
wherein the matrix composition is an epoxy resin composition that comprises:
a component (A): an epoxy resin;
a component (B): an epoxy resin curing agent; and
a component (C): a compound which is at least one selected from the group consisting of an ester compound having an alkyl group having 5 to 40 carbon atoms and a fatty alcohol having an alkyl group having 5 to 40 carbon atoms.

11. The molding material according to claim 10, wherein at least one kind of compounds contained for the component (C) is an aliphatic compound having a hydroxyl group, and wherein the aliphatic compound is the ester compound, the fatty alcohol, or both.

12. The molding material according to claim 11, wherein the at least one kind of compounds contained for the component (C) is a sorbitan fatty acid ester.

13. The molding material according to claim 12, wherein the at least one kind of compounds contained for the component (C) is sorbitan monostearate.

14. A method for manufacturing the molding material according to claim 10, the method comprising:
preparing the epoxy resin composition comprising the component (A), the component (B), and the component (C); and
impregnating the reinforcement fiber with the epoxy resin composition as a matrix composition.

15. The method according to claim 14, wherein the epoxy resin composition at least contains an aliphatic compound having a hydroxyl group as the component (C), and wherein the aliphatic compound is the ester compound, the fatty alcohol, or both.

16. The method according to claim 14, wherein the epoxy resin composition at least contains a sorbitan fatty acid ester as the component (C).

17. The method according to claim 14, wherein the epoxy resin composition at least contains sorbitan monostearate as the component (C).

18. The method according to claim 14, wherein the reinforcement fiber is a carbon fiber.

19. The method according to claim 14, wherein the molding material is a sheet molding compound.

* * * * *